(12) United States Patent
Ohtake

(10) Patent No.: US 9,218,155 B2
(45) Date of Patent: Dec. 22, 2015

(54) PORTABLE INFORMATION TERMINAL, DISPLAY CONTROL METHOD, AND PROGRAM

(75) Inventor: Hiroshi Ohtake, Tokyo (JP)

(73) Assignee: NEC CORPORATION, Tokyo (JP)

( * ) Notice: Subject to any disclaimer, the term of this patent is extended or adjusted under 35 U.S.C. 154(b) by 771 days.

(21) Appl. No.: 13/514,797

(22) PCT Filed: Dec. 15, 2010

(86) PCT No.: PCT/JP2010/072524
§ 371 (c)(1),
(2), (4) Date: Jun. 8, 2012

(87) PCT Pub. No.: WO2011/074595
PCT Pub. Date: Jun. 23, 2011

(65) Prior Publication Data
US 2012/0242685 A1    Sep. 27, 2012

(30) Foreign Application Priority Data

Dec. 18, 2009    (JP) .................................. 2009-287432

(51) Int. Cl.
*G09G 5/00*    (2006.01)
*G06F 3/14*    (2006.01)

(52) U.S. Cl.
CPC ........ *G06F 3/1446* (2013.01); *G09G 2340/145* (2013.01); *G09G 2380/14* (2013.01)

(58) Field of Classification Search
None
See application file for complete search history.

(56) References Cited

U.S. PATENT DOCUMENTS

| 7,433,179 | B2 | 10/2008 | Hisano et al. |
| 2002/0021296 | A1 | 2/2002 | Tsuji et al. |
| 2003/0001966 | A1 | 1/2003 | Matsubara et al. |
| 2007/0252822 | A1 | 11/2007 | Kim et al. |

FOREIGN PATENT DOCUMENTS

| JP | 61-147290 | 7/1986 |
| JP | 02-281328 | 11/1990 |
| JP | 07-199881 | 8/1995 |
| JP | 09-305259 | 11/1997 |
| JP | 2000-10655 | 1/2000 |
| JP | 2000181872 | 6/2000 |
| JP | 2002-006822 | 1/2002 |
| JP | 2006-53678 | 2/2006 |
| JP | 2009-076038 | 4/2009 |
| WO | WO 01/52031 | 7/2001 |

OTHER PUBLICATIONS

International Search Report, PCT/JP2010/072524, Mar. 29, 2011.
Extended European Search Report, dated Oct. 21, 2014, in corresponding European Patent Application No. 10837621.1.
Japanese Office Action dated Sep. 2, 2014 in corresponding Japanese Patent Application No. 2011-546141 with English translation of enclosed wavy lined portion of Japanese Office Action.

*Primary Examiner* — Kenneth B Lee, Jr.
(74) *Attorney, Agent, or Firm* — Young & Thompson

(57) ABSTRACT

A portable information terminal includes a display element and a control element. The display element includes a plurality of display screens. The control element divides a whole image including two or more rows of individual images arrayed in a direction where the plurality of display screens are arrayed into a plurality of divided images by a dividing line passing through gaps between the individual images in the respective rows, and displays each of the divided images on each of the display screens of the display element.

12 Claims, 12 Drawing Sheets

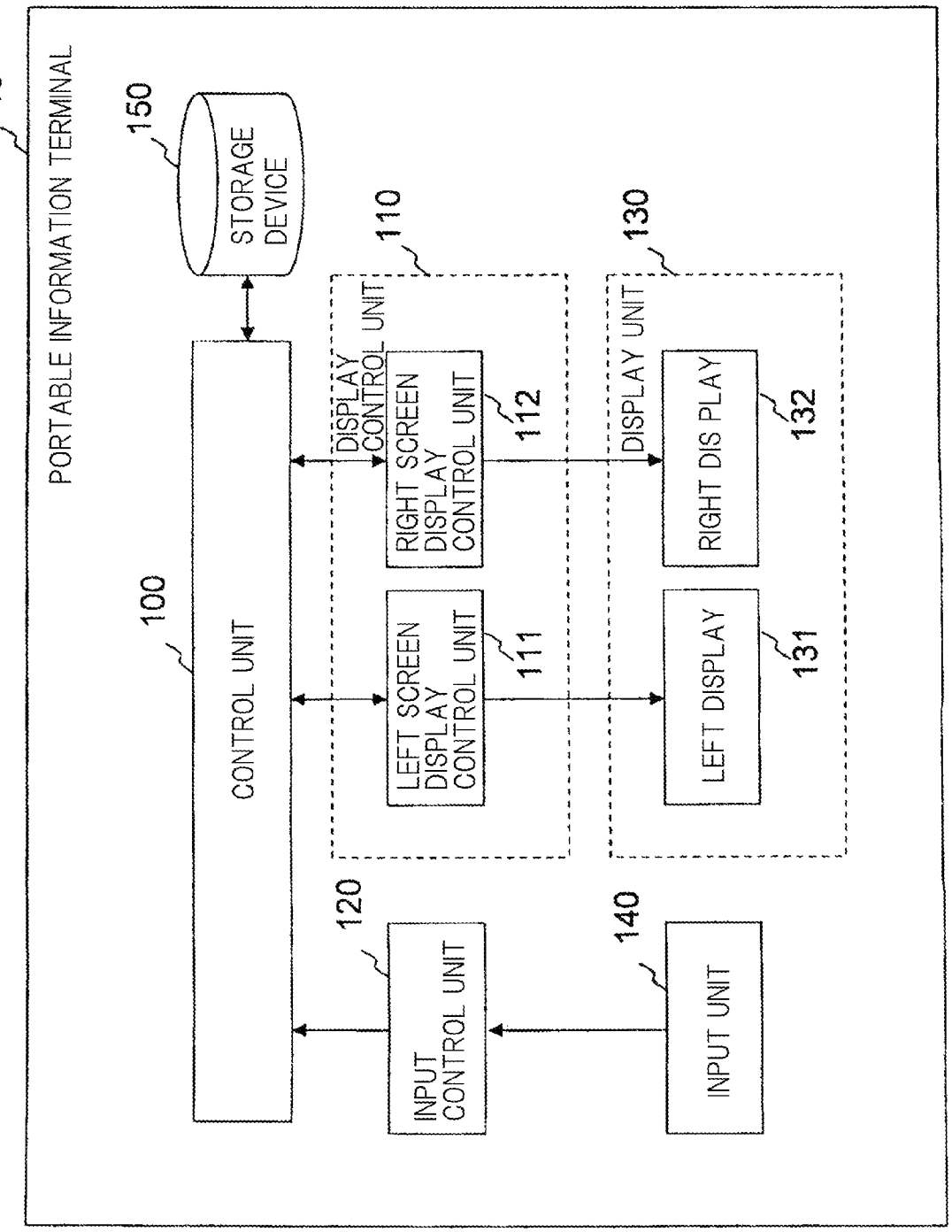

503   504

PORTABLE INFORMATION TERMINAL, DISPLAY CONTROL METHOD, AND PROGRAM

TECHNICAL FIELD

The present invention relates to a display control method for a portable information terminal that includes a plurality of display screens.

BACKGROUND ART

The portable information terminal represented by a portable telephone, a PDA (Personal Digital Assistant), or an electronic notebook generally includes a display unit that displays a text or an image on the display screen of a liquid crystal or the like. A certain portable information terminal includes a plurality of display screens in its display unit. For example, Patent Literature 1 discloses a portable information terminal that is formed into an openable and closable folding structure having a plurality of cases and that includes a display screen in each of the plurality of cases. The portable information terminal disclosed in Patent Literature 1 is compact and highly portable in a closed state, and can provide a large screen in an opened state.

The portable information terminal of this type may display one image by dividing it to match two display screens. Generally, when the image is divided to be displayed on the two display screens, the image is divided by a dividing line defined to match a size of each display screen. For example, when the two display screens are equal in size, the center line of the original image becomes a dividing line.

Dividing one image into a plurality to display it enables displaying of a character, an icon or a picture included in the image in a magnified manner. However, because of a gap between the display screens, the character, the icon or the picture included in the original image may be divided so that it becomes difficult to see.

To deal with this problem, a technology has been developed which reduces the difficulty of viewing images that is caused by the gap that occurs between the display screen (refer to Patent Literature 2). When one image is divided to be displayed on two display panels, the display device described in Patent Literature 2 shifts the image so as to prevent positioning of the image such that the image will be divided on the character if the character, as a result of the gap that occurs between the display screens when the image is simply divided at the center, becomes divided.

CITATION LIST

Patent Literature

Patent Literature 1: JP2009-76038A
Patent Literature 2: JP2002-006822A

SUMMARY OF INVENTION

Problems to be Solved by Invention

However, a certain image actually displayed on the display screen includes a plurality of individual images such as characters or pictures, and the arrangement of the individual images are complex in many cases. For example, as a display form, in the case of a sentence that continues over a plurality of rows in which a proportional font is used, the position of the character in the column direction differs from one row to another. In some cases, even when the technology disclosed in Patent Literature 1 is used for such a complex image, the image cannot be shifted to prevent breakage of the characters in all the rows.

The whole image may include, as individual images, not only characters but also images such as pictures. In such a case, the whole image includes various individual images different from one another in size, further complicating the configuration of the whole image.

It is therefore an object of the present invention to provide a technology which resolves the problem in which an image is difficult to view when the image is divided to be displayed on a plurality of display screens in an information processing device that includes a plurality of display screens.

Solution to Problems

To achieve the object, a portable information terminal according to the present invention includes: display means including a plurality of display screens; and control means for dividing a whole image including two or more rows of individual images arrayed in a direction where the plurality of display screens are arrayed into a plurality of divided images by a dividing line that passes through gaps between the individual images in the respective rows, and displaying each of the divided images on each of the display screens of the display means.

A display control method in a portable information terminal including a plurality of display screens according to the present invention includes: dividing, by control means, a whole image including two or more rows of individual images arrayed in a direction where the plurality of display screens are arrayed into a plurality of divided images by a dividing line that passes through gaps between the individual images in the respective rows; and displaying, by the control means, each of the divided images on each of the display screens of the display means.

A display control program for causing a computer to execute display control in a portable information terminal including a plurality of display screens according to the present invention includes: a procedure of dividing a whole image including two or more rows of individual images arrayed in a direction where the plurality of display screens are arrayed into a plurality of divided images by a dividing line that passes through gaps between the individual images in the respective rows; and a procedure of displaying each of the divided images on each of the display screens of the display means.

BRIEF DESCRIPTION OF DRAWINGS

FIG. 2B is a block diagram showing a detailed configuration of the portable information terminal according to this embodiment.

DESCRIPTION OF EMBODIMENTS

A portable information terminal according to this embodiment includes two display screens, and displays various images on the two display screens according to processing of applications or user's operation inputs. This portable information terminal can divide one image into two to match the two display screens, and display them.

All images to be displayed by the portable information terminal are referred to as a whole image, and the two images acquired by dividing the whole image to be displayed on the two screens are referred to as divided images. Characters or pictures included in the whole image are referred to as individual images.

Figure 1A:
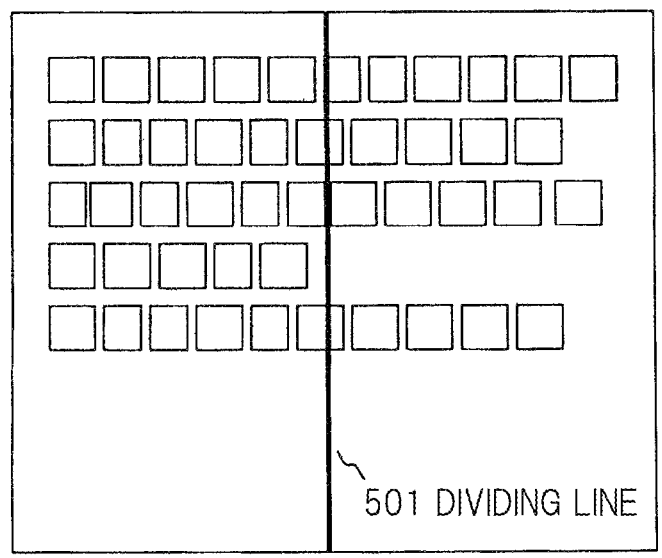
FIG. 1A shows an example of a whole image including a plurality of individual images.

FIG. 1A shows an example of the whole image including a plurality of individual images: the example where a plurality of rows of sentences including characters using a proportional font is included in the whole image. Each character corresponds to an individual image, and squares in the drawing indicate individual images.

In the whole image shown in FIG. 1A, the positions of the characters of a row direction in the respective rows do not match each other between the rows. When the individual images are thus arranged in a complex manner in the whole image, it is difficult to divide the whole image into two by dividing line 501 so as to prevent division of any individual image.

Figure 1B:
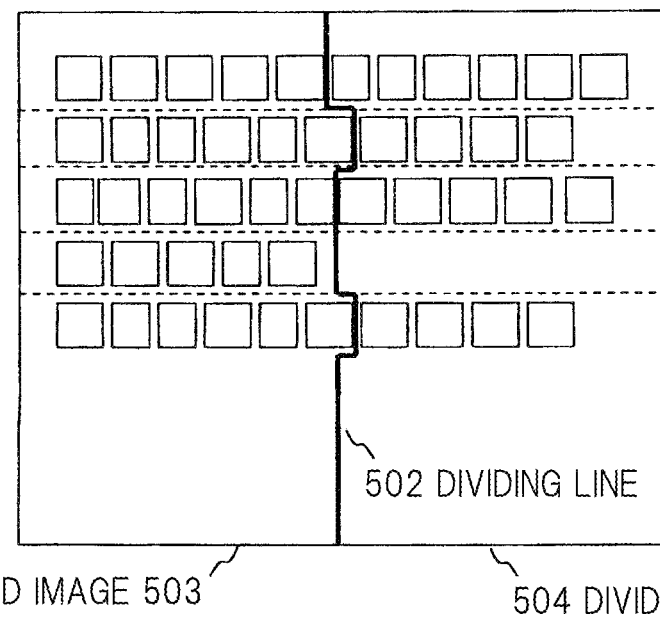
FIG. 1B is an explanatory diagram showing dividing line 502 of the whole image shown in FIG. 1A.

In the portable information terminal according to this embodiment, as shown in FIG. 1B, for such a whole image, dividing line 502 is defined to pass through the gap between the characters in each row. The whole image is then divided into two left and right divided images 503 and 504 by dividing line 502.

Figure 1C:
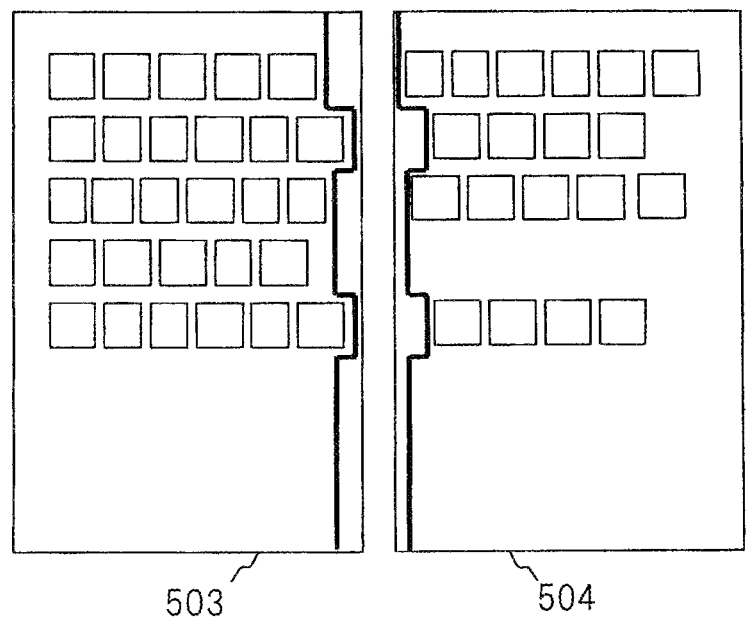
FIG. 1C shows divided images 503 and 504 divided by the dividing line shown in FIG. 1B.

Specifically, in the portable information terminal according to this embodiment, the rows including the individual images are detected in the whole image, gaps between the individual images are detected for the respective rows, and dividing line 502 is defined to pass through the gaps between the individual images in the respective rows. In the portable information terminal, the whole image is divided by dividing line 502, and divided images 503 and 504 thus acquired are displayed on the respective display screens as shown in FIG. 1C.

According to the portable information terminal of this embodiment, the whole image including the plurality of individual images is divided into two divided images by the dividing line that passes through the gaps between the individual images constituting the rows in a direction where the two display screens are arrayed. This can prevent division of the individual images such as characters or pictures which would be come difficult to see.

Figure 2A:
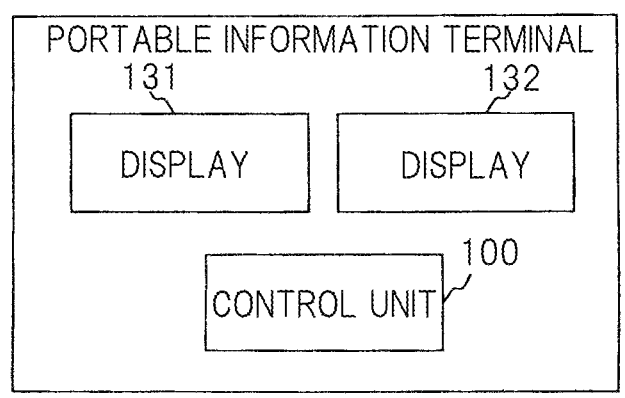
FIG. 2A is a block diagram schematically showing the configuration of a portable information terminal according to this embodiment.

FIG. 2A is a block diagram schematically showing the configuration of the portable information terminal according to this embodiment. Referring to FIG. 2A, the portable information terminal according to this embodiment includes two displays 131 and 132, and control unit 100.

Control unit 100 divides the whole image including the plurality of individual images into two divided images 503 and 503 by dividing line 502 that passes through the gaps between the individual images constituting the rows in the direction where two displays 131 and 132 are arrayed. For example, when displays 131 and 132 are horizontally arrayed, the rows are horizontal. Then, control unit 100 displays two divided images 503 and 504 on respective displays 131 and 132.

The portable information terminal according to this embodiment can interlockingly scroll the whole image divided into two divided images 503 and 504 and displayed on the two display screens. When an operation input is carried out to scroll the whole image, the portable information terminal brings two divided images 503 and 504 close to each other to couple them following the scrolling. After the end of coupling, the portable information terminal scrolls the whole image while maintaining the coupled state. After the end of the operation input for scrolling, the portable information terminal defines new dividing line 502 for the whole image at this time, and displays divided images 503 and 504 acquired by dividing the whole image by dividing line 502 on the respective display screens.

Hereinafter, the portable information terminal according to this embodiment is described in detail.

FIG. 2B is a block diagram showing the detailed configuration of the portable information terminal according to this embodiment.

As shown in FIG. 2B, portable information terminal 10 according to this embodiment includes control unit 100, display control unit 110, input control unit 120, display unit 130, input unit 140, and storage unit 150.

Display unit 130 is a storage device that includes two displays, namely, left display 131 and right display 132, arranged to be adjacent to each other. Left display 131 and right display 132 are equal in size. In the normal use state where left display 131 and right display 132 are horizontally arranged, left display 131 is located on the left side and right display 132 is located on the right side.

Input unit 140 is a touch-panel input device integrally configured with left display 131 and right display 132 of display unit 130 to detect a user's operation input. However, this is only an example. As other examples, input unit 140 can be a touch panel type not integral with display unit 130 or a push-button type other than the touch panel type.

Display control unit 110 includes left screen display control unit 111 and right screen display control unit 112 respectively corresponding to left display 131 and right display 132. Divided images 503 and 504 are respectively supplied to left screen display control unit 111 and right screen display control unit 112 from control unit 100. Left screen display control unit 111 and right screen display control unit 112 display supplied divided images 503 and 504 on displays 131 and 132.

Input control unit 120 receives the operation input detected by input unit 140, and notifies control unit 100 of the operation input as input information.

Storage unit 150 includes a read-only memory, a random access memory, and a frame buffer. The read-only memory stores various control programs executed by display control unit 110 or fixed data used for processing by display control unit 110. The random access memory temporarily stores data when control unit 100 or display control unit 110 executes a control program or an application program. The frame buffer temporarily stores the whole image displayed on display unit 310.

Control unit 100 controls the respective units in portable information terminal 10 by executing the control programs stored in the read-only memory of storage unit 150.

Further, control unit 100 executes an application based on input information from input control unit 120 or other events. Along with the execution of the application, control unit 100 displays an image on display unit 130. In this case, control unit 100 divides the whole image of the frame buffer into two divided images 503 and 504, and supplies divided images 503 and 504 to left screen display control unit 111 and right screen display control unit 112 of display control unit 110.

When the whole image is divided into two, control unit 100 detects rows including individual images in the whole image, detects gaps between the individual images in the respective rows, and divides the whole image by dividing line 502 defined to pass through the gaps between the individual images in the respective rows.

Control unit 100 interlockingly scrolls and displays divided images 503 and 504 displayed on the two display screens according to a control input from input control unit 120.

When a scroll operation is input, control unit 100 brings the divided images close to each other to couple them following scrolling of divided images 503 and 504. The dividing line during and after scrolling is a straight line regardless of whether the individual images in the whole image are divided. Then, after the end of the operation input for scrolling, control unit 100 defines new dividing line 502 for the whole image at this time, and displays divided images 503 and 504 acquired by dividing the whole image by dividing line 502 on the respective display screens.

Processing when the image is divided to be displayed on left display 131 and right display 132 is referred to as divided display processing, and processing when the image is scrolled from the state where the image is divided to be displayed is referred to as interlocking scroll processing.

(Divided Display Processing)

First, divided display processing is described.

Figure 3:
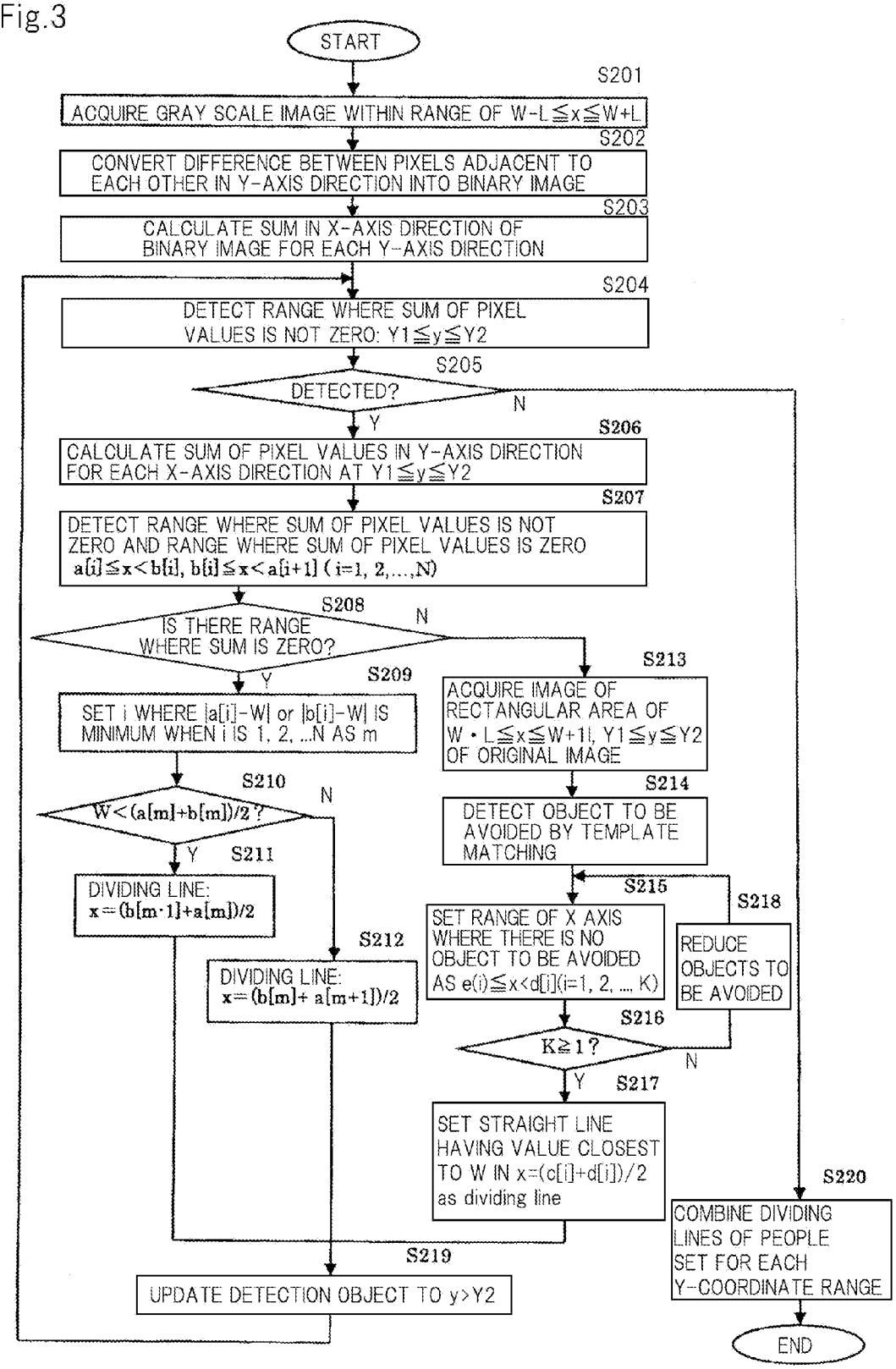
FIG. 3 is a flowchart showing divided display processing carried out by control unit 100.
Figure 4:
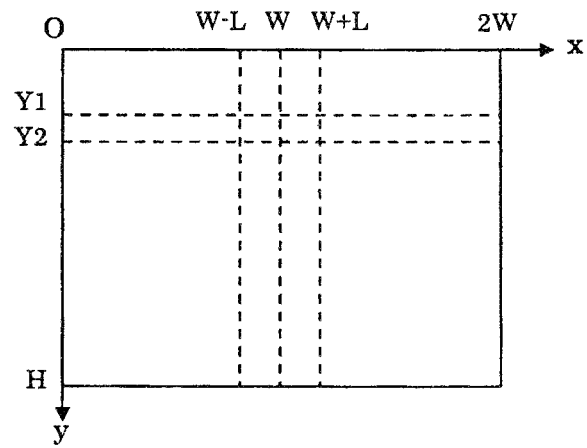
FIG. 4 is an explanatory diagram showing the coordinate system of the whole image.

FIG. 3 is a flowchart showing the divided display processing carried out by control unit 100. FIG. 4 is an explanatory diagram showing the coordinate system of the whole image.

In an example shown in FIG. 4, an x axis is set in the arraying direction of left display 131 and right display 132, and a y axis is set in a direction orthogonal to the x axis. In many cases, image data is stored in the order from left to right and from the upper side to the lower side. Thus, the left upper side is original point O, the x axis is the right direction, and the y axis is the downward direction. In the whole image, the width of the x axis direction is 2W, and the height of the y axis direction is H.

According to this embodiment, dividing line 502 is determined within the range of W−L≤x≤W+L in the whole image to carry out division. Hereinafter, the range of W−L≤x≤W+L is referred to as a divided area. The display widths of left display 131 and right display 132 are equal to or greater than W+L.

Left display 131 and right display 132 are equal in size, and hence x=W is a dividing line if the individual images are not taken into consideration. According to this embodiment, dividing line 502 is defined in the divided area to prevent division of the individual images. When the width 2L of the divided area becomes large, the sentence becomes difficult to read, or the character or the image becomes small. Thus, the width 2L is set to an appropriate value in view of this. The width 2L of the divided area can be set from an application.

Referring to FIG. 3, first, control unit 100 converts the part of the divided area of the whole image to generate a gray scale image (monochrome image) (step S201). The gray scale image can be generated by summing up the values of the color components of the original color image, or weighting the values of the color components to sum up the values according to characteristics of the human eye.

Then, control unit 100 generates a binary image from the gray scale image (step S202). In this case, control unit 100 first generates a difference image by converting pixels adjacent to each other in the y axis direction of the gray scale image. Specifically, control unit 100 sets the absolute value of the difference between a pixel value of (x and y) and a pixel value of (x and y+1) as a pixel value of (x and y). Control unit 100 then generates a binary image by binarization to set a value of a pixel having a value other than 0 in the difference image to 1.

In this binary image, a pixel having a pixel value of 1 appears in the part of a character or a picture where an individual image is present. Control unit 100 estimates, by using the binary image, the positions of the individual images and the rows including the individual images as described below.

Figure 5:
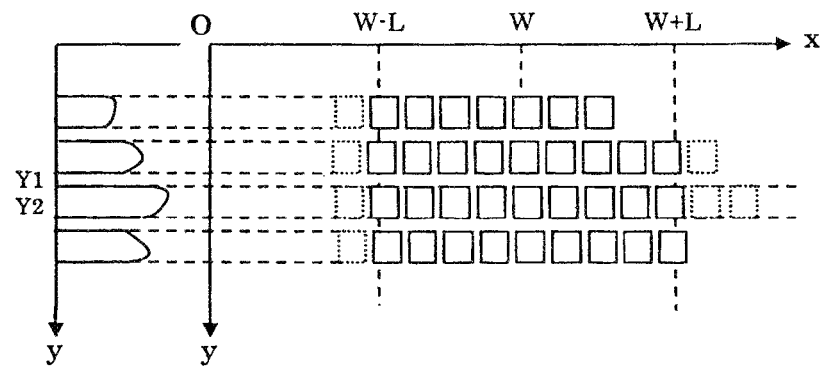
FIG. 5 is an explanatory diagram showing the calculation of a sum of pixel values of a binary image in an x axis direction in each y-coordinate.

As shown in FIG. 5, control unit 100 calculates the sum of pixel values of the binary image in the x axis direction for each y coordinate (step S203). A graph on the left side of FIG. 5 shows the result of the calculation. In an area where there is a character string or an image, the sum of the pixel values is other than 0.

Based on the calculation result, control unit 100 searches for the range of the y coordinate where the sum of the pixel values is not 0 in the positive direction of the y axis from y=0, and sets the detected range of the y coordinate as Y1≤y≤Y2 (step S204). This range is estimated to be a range where there are individual images or rows including the individual images.

Figure 6A:
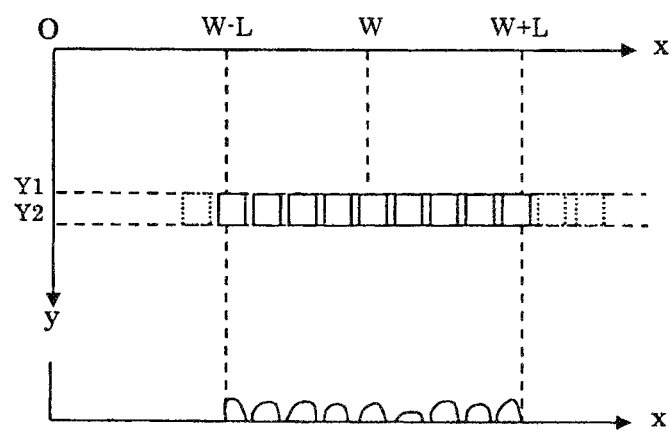
FIG. 6A is an explanatory diagram showing processing to set a dividing line in a gap between individual images in each row.

When the range Y1≤y≤Y2 of the y coordinate where the sum of the pixel values is not 0 is detected (Yes in step S05), then, as shown in FIG. 6A, control unit 100 calculates the sum of pixel values of the binary image in the y axis direction for each x coordinate within the range of W−L≤x≤W+L and Y1≤y≤Y2 (step S206). A graph on the lower side of FIG. 6A shows the sum of the pixel values of the binary image in the y axis direction. Individual images are present in the range where the sum of the pixel values is not 0, and the range, where the sum of the pixel images is 0, is estimated to be the gap between the individual images.

Figure 6B:
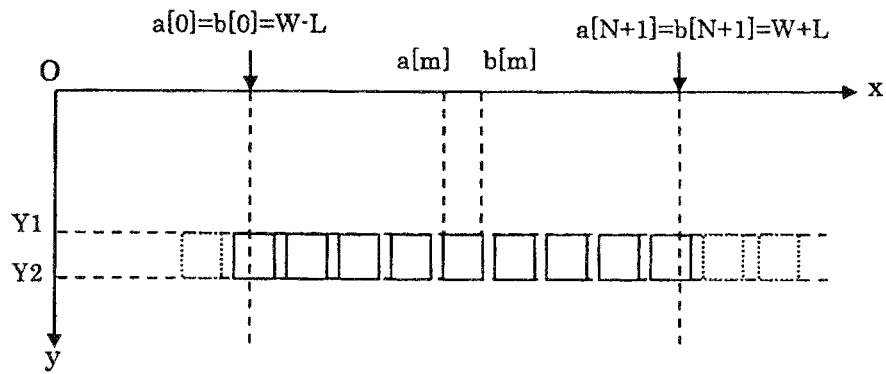
FIG. 6B is an explanatory diagram showing processing to set a dividing line in a gap between individual images in each row.

As shown in FIG. 6B, control unit 100 sets the range where the sum of the pixel values is not 0 to a[i]≤b[i](i=1, 2, . . . , N), and the range where the sum of the pixel values is 0 to b[i]≤x<a[i+1](i=1, 2, . . . , N) (step S207). For convenience, a[0]=b[0]=W−L and a[N+1]=b[N+1]=W+L are set.

When the range, where the sum of the pixel values is 0, is not present at W−L≤x≤W+L (No in step S208), control unit 100 determines that there are individual images over the width 2L of the divided area, and proceeds to image division processing. The image division processing is described below.

When the range, where the sum of the pixel values is 0, is not present at W−L≤x≤W+L (Yes in step S208), control unit 100 sets i where the value of a[i] or b[i] approaches W as m (step S209).

Figure 6C:
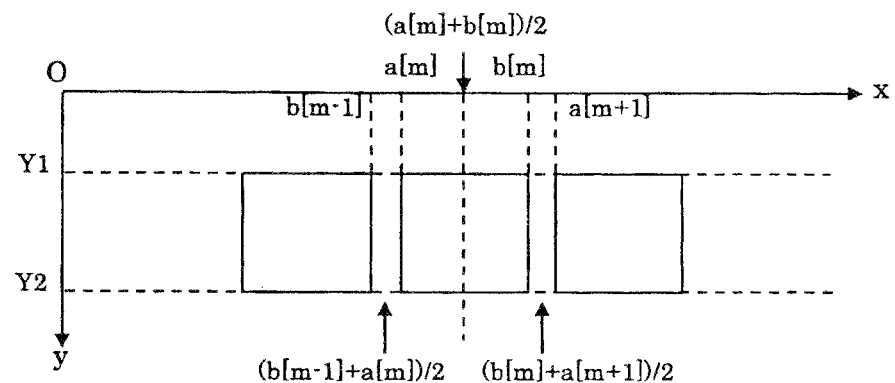
FIG. 6C is an explanatory diagram showing processing to set a dividing line in a gap between individual images in each row.

Further, as shown in FIG. 6C, control unit 100 sets a dividing line in the gap between the individual images nearest the center of the whole image in the x axis direction.

Specifically, control unit 100 sets, when the relationship between center W of the whole image in the x axis direction and a[m] and b[m] is W<a[m]+b[m])/2 (Yes in step S210), the dividing line within the range of Y1≤y≤Y2 at the position of x=(b[m−1]+a[m])/2 (step S211). In the case of W≥a[m]+b[m])/2 (No in step S210), control unit 100 sets the dividing line at the position of x=(b[m]+a[m+1])/2 (step S211).

Next, image division processing to divide the individual image over the width of the divided area is described. This image division processing is for setting a dividing line to divide a large image such as a picture present in the rectangular area of W−L≤x≤W+L and Y1≤y≤Y2 at an appropriate position.

As described above, when the range, where the sum of the pixel values of the binary image in the y axis direction for each x coordinate is 0, is not present at W−L≤x≤W+L (No in step S208), this image division processing is executed.

First, as preprocessing, control unit 100 acquires the gray scale image of the rectangular area, and binarizes the gray scale image to generate a binary image (step S213). In the abovementioned binarization, values other than 0 are all set to 1. In this case, however, binarization is carried out by comparing the pixel value of the gray scale image with a predetermined threshold value as an example.

Then, control unit 100 executes template matching for the binary image of the rectangular area by using an image prepared beforehand for an object to be avoided such as a human face, a car, or a building as a template image (step S214). By this template matching, the range where the object to be avoided can be specified.

Objects concerning which there is no desire that they be divided are set as objects to be avoided. Priority is defined for the objects to be avoided, and priority is given to the template image of each object to be avoided. This priority can be set according to division undesirability. For example, higher priority may be given to a human face than to a building.

Control unit 100 sets the range of an x coordinate, where no object to be avoided is present, to c[i]≤x<d[i](i=1, 2, . . . , K) (step S215), and determines whether there is one or more ranges of c[i]≤x<d[i] (step S216).

Figure 7:
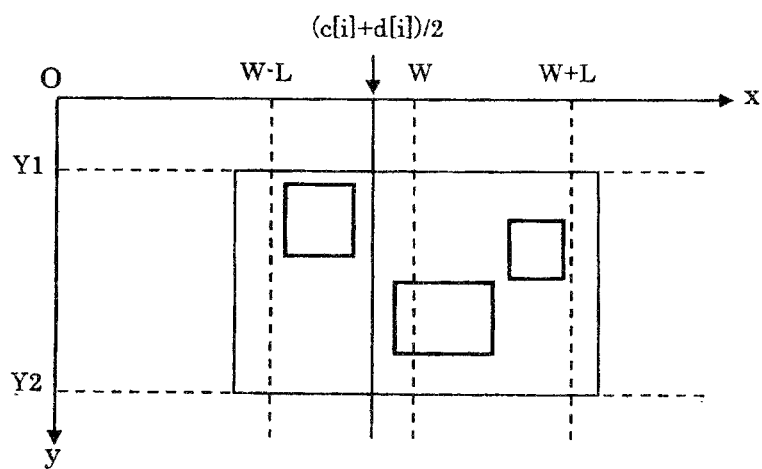
FIG. 7 shows an example of a dividing line to divide an individual image in each row.

When there is one or more ranges of c[i]≤x<d[i], then, as shown in FIG. 7, control unit 100 sets a straight line where the value of x is nearest W in x=(c[i]+d[i])/2 as a dividing line (step S217). In FIG. 7, in a square that indicates an individual image, a thick-line square indicating the range of the object to be avoided is drawn. The dividing line is set to divide the individual image at the position of avoiding the range of the object that is to be avoided.

When there is no range of an x coordinate, where no object that is to be avoided is present in the determination of step S216, control unit 100 repeats removal from the object to be avoided corresponding to the template image of low priority (step S218) until the range of the x coordinate where no object to be avoided is present appears.

After the abovementioned series of processes has ended for the range of Y1≤y≤Y2, control unit 100 updates the detection target to the range of y>Y2 (step S219), searches for the range of the y coordinate where the sum of pixel values in the x axis direction is not 0 for each y axis in the binary image of the divided area shown in a graph on the left side of FIG. 5 (step S204), and repeats a similar series of processes.

When no such range of the y coordinate where the sum of pixel values in the x axis direction is not 0 is detected (No in step S205), control unit 100 completes the processing of setting dividing lines for the respective ranges of the y axis direction, and then connects the dividing lines (step S220). In this processing operation that connects the dividing lines, control unit 100 combines the dividing lines set at intervals in the y axis direction to become continuous lines within the range of 0≤y<H.

Specifically, control unit 100 first extends both ends of each dividing line to the center to match the y coordinates of the adjacent dividing lines with each other. Then, control unit 100 connects the leading ends of the adjacent sides of the adjacent dividing lines with each other by a straight line parallel to the x axis. This completes dividing line 502.

When a dividing line to divide the individual image by image division processing is set, the part corresponding to the gap between left display 131 and right display 132 can be deleted from the individual image. The image to be divided and displayed can accordingly be displayed seemingly with the same balance as that of the original image. However, in such a case, even the part corresponding to the gap between left display 131 and right display 132 may not be deleted if the area of the object to be avoided is included.

Figure 8:
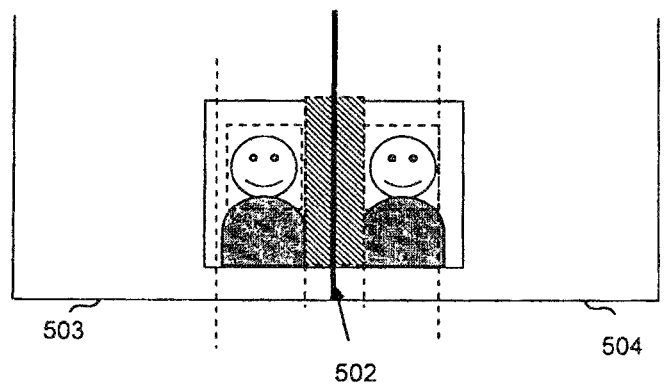
FIG. 8 is an explanatory diagram showing processing when a picture depicting two humans is divided by a dividing line.

FIG. 8 is an explanatory diagram showing processing when a picture depicting two people is divided by a dividing line. To divide this picture, under the condition in which a part that is to be avoided does not include an object that is to be avoided, parts corresponding to the gap between left display 131 and right display 132 are deleted from the portion included in divided image 503 of the picture and the portion included in divided image 504. In this example, a human face is an object to be avoided. Hutched parts are deleted.

Figure 9A:
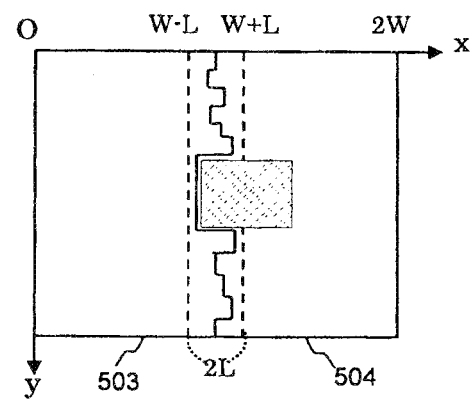
FIG. 9A shows an example of dividing line 502.

FIG. 9A shows an example of dividing line 502 thus determined. FIG. 9A shows the example where dividing line 502 is set in the whole image that has large images such as pictures buried in a plurality of sentences. A hutched square indicates a large individual image. However, this individual image is not located over the width 2L of the divided area.

Figure 9B:
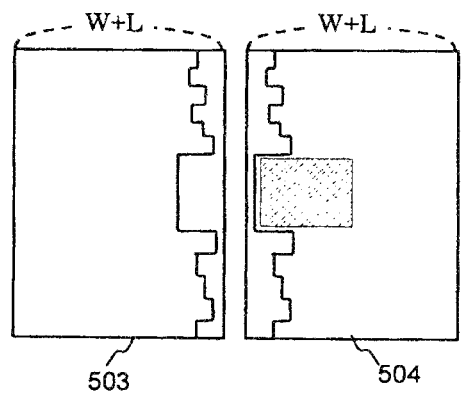
FIG. 9B shows divided images 503 and 504 divided by dividing line 502 shown in FIG. 9A.

After dividing line 502 has been determined at 0≤y≤H, control unit 100 divides the whole image into two divided images 503 and 504 by dividing line 502, and respectively displays the images on left display 131 and right display 132. Specifically, control unit 100 displays left divided image 503 included in the range of 0≤x≤W+L on left display 131 and right divided image 504 included in the range of W−L≤x≤2W on right display 132. FIG. 9B shows the state where divided images 503 and 504 divided by dividing line 502 are displayed on left display 131 and right display 132. A hutched individual image is not located over the width 2L of the divided area, hence it is not divided by the dividing line.

(Interlocking Scroll Processing)

Next, interlocking scroll processing is described.

In the interlocking scroll processing, when an operation input for scrolling is executed in a state where divided images 503 and 504 acquired by dividing the whole image by dividing line 502 are displayed on left displays 131 and 132, the divided images are brought close to each other to be coupled together following the scrolling. After the end of the scrolling operation input, the whole image is divided by new dividing line 502 at this time to be displayed on each display screen.

Figure 10:
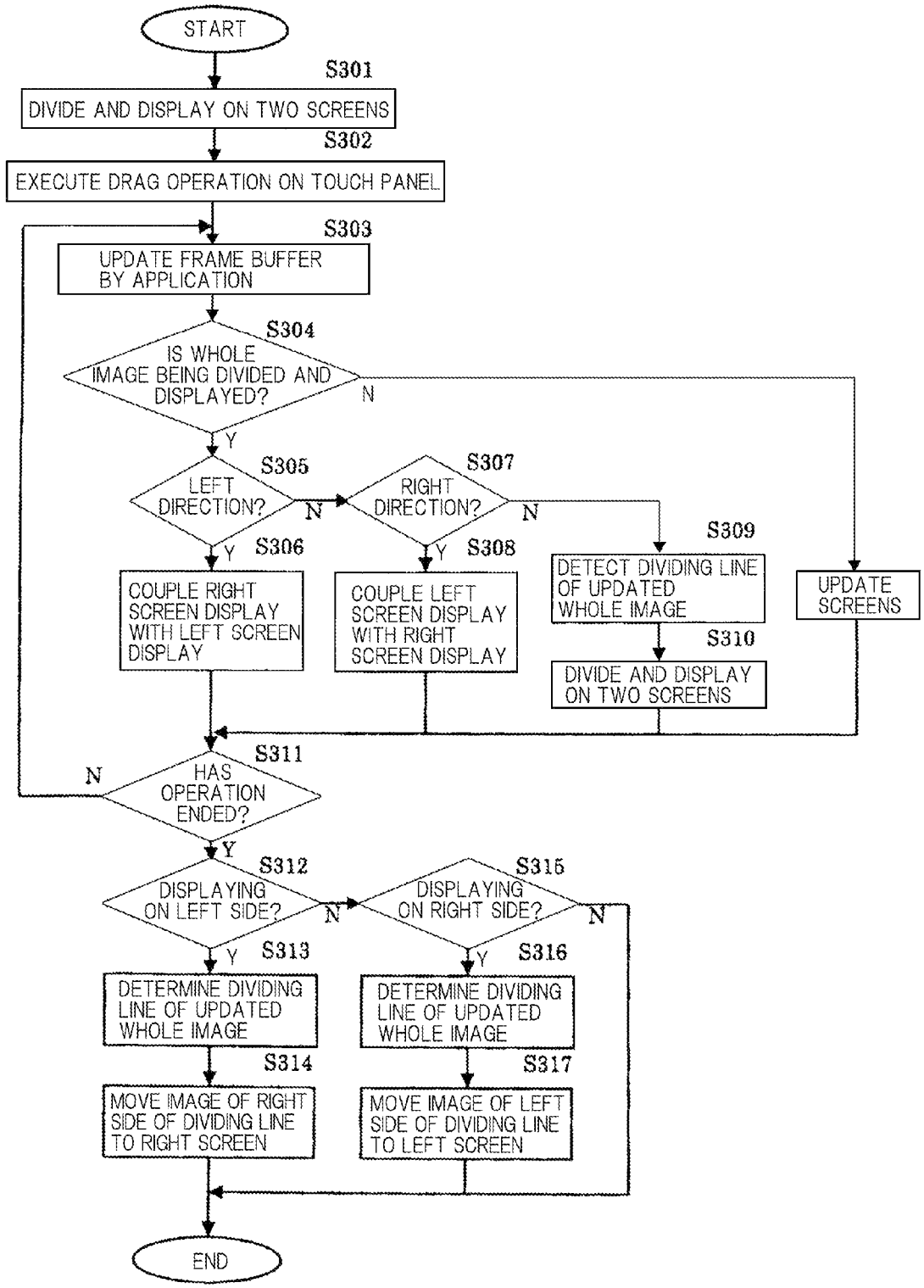
FIG. 10 is a flowchart showing interlocking scroll processing to scroll a screen by a drag operation on a touch panel.

FIG. 10 is a flowchart showing the interlocking scroll processing to scroll a screen by a drag operation executed on the touch panel.

In a state where the whole image is divided by dividing line 502 and displayed on left display 131 and right display 132 (step S301), when the user executes a drag operation on the touch panel (step S302), control unit 100 updates the frame buffer to store the whole image data as processing by an application (step S303).

Then, in the case of the state where the whole image is being divided by dividing line 502 to be displayed (step S304), control unit 100 executes the following process.

When the drag operation is directed left (Yes in step S305), control unit 100 brings the image displayed on right display 132 close to the image displayed on left display 131 to couple them (step S306). During scrolling after the coupling, control unit 100 divides the whole image by using the straight line of x=W+L as a dividing line. The displaying in this case is referred to as left displaying.

When the drag operation is directed right (Yes in step S307), control unit 100 brings the image displayed on left display 131 close to the image displayed on right display 132 to couple them (step S308). During scrolling after the coupling, control unit 100 divides the whole image by using the straight line of x=W−L as a dividing line. The displaying in this case is referred to as right displaying.

When the drag operation is directed neither left nor right (No in step S307), control unit 100 determines dividing line 502 for the updated whole image (step S309), divides the whole image by dividing line 502, and displays divided images 503 and 504 on left display 131 and right display 132 (step S310). An example is a case where the drag operation is directed upward or downward.

In this case, control unit 100 can set a new dividing line only for the part that has newly appeared in the updated whole image. Even when the drag operation is directed upward or downward, during high-speed scrolling, control unit 100 can divide the whole image by a straight dividing line.

Then, control unit 100 determines whether the drag operation has ended (step S311). When it is determined that the drag operation has not ended, control unit 100 returns to step S303.

On the other hand, when it is determined that the drag operation has ended, control unit 100 determines whether left displaying is being executed (step S312). When it is determined that the left displaying is being executed, control unit 100 determines new dividing line 502 for the updated whole image to divide the whole image (step S313). Control unit 100 then moves right divided image 504 of dividing line 502 to right display 132 (step S314).

On the other hand, when it is determined that the left displaying is not being executed, control unit 100 determines whether right displaying is being executed (step S315). When it is determined that the right displaying is being executed, control unit 100 determines new dividing line 502 for the updated whole image to divide the whole image (step S316). Control unit 100 then moves left divided image 503 of dividing line to left display 131 (step S317).

When a state where the whole image has been divided to be displayed is set by the abovementioned processing, control unit 100 ends the processing.

Figure 11A:
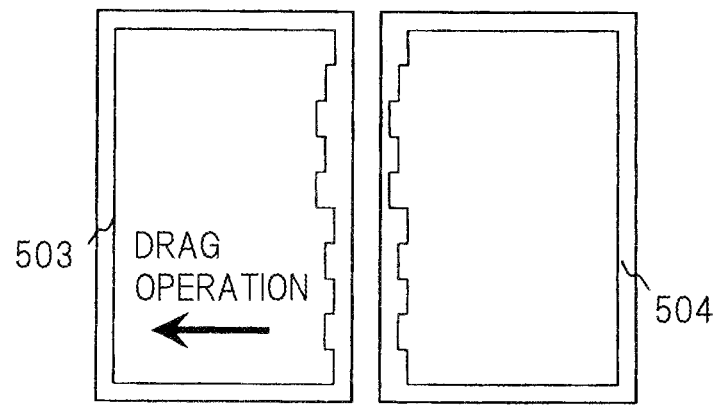
FIG. 11A shows the change of a screen display during the drag operation for scrolling.
Figure 11B:
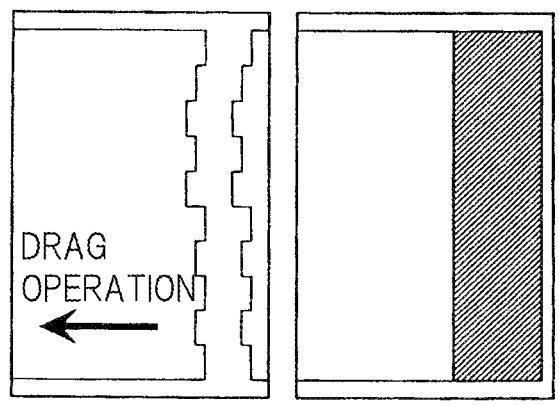
FIG. 11B shows the change of a screen display during the drag operation for scrolling.
Figure 11C:
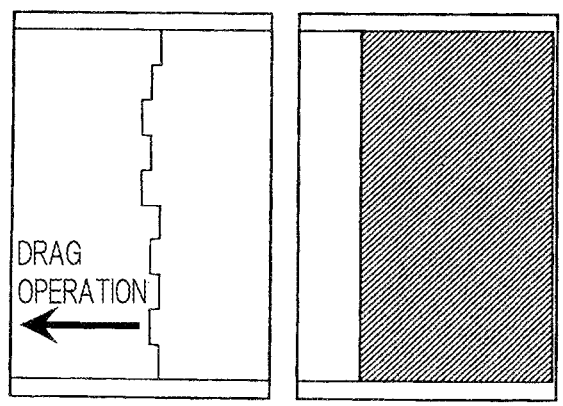
FIG. 11C shows the change of a screen display during the drag operation for scrolling.

FIGS. 11A to 11C show the changes of a screen display during the drag operation for scrolling. Left scrolling is shown. Right scrolling is similar except for left and right reversal.

As shown in FIG. 11A, when an operation input for scrolling is executed in the state where divided images 503 and 504 are displayed on left display 131 and right display 132, control unit 100 brings, as shown in FIG. 11B, divided images 503 and 504 close to each other to couple them following scrolling. During the scrolling after the coupling, control unit 100 interlockingly scrolls the images while keeping the coupled state of divided images 503 and 504 as shown in FIG. 11C.

Figure 12A:
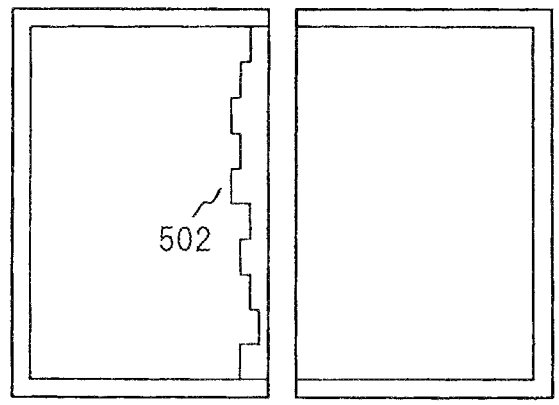
FIG. 12A shows the change of a screen display when the drag operation for scrolling ends.
Figure 12B:
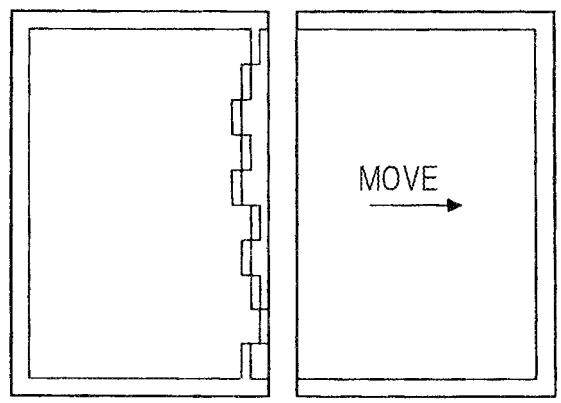
FIG. 12B shows the change of a screen display when the drag operation for scrolling ends.
Figure 12C:
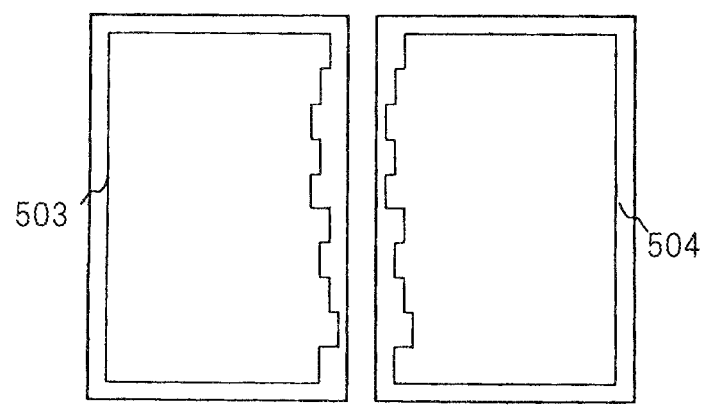
FIG. 12C shows the change of a screen display when the drag operation for scrolling ends.

FIGS. 12A to 12C show the changes of the screen display when the drag operation for scrolling ends.

After the end of the drag operation, control unit 100 determines new dividing line 502 shown in FIG. 12A, moves right divided image 504 of dividing line 502 to the right as shown in FIG. 12B, and displays divided image 504 on right display 132 as shown in FIG. 12C.

Input unit 140 included in the portable information terminal according to this embodiment, which is a touch panel type integrally configured with displays 131 and 132, can scroll the whole image by a touch operation on any one of the displays. For example, until divided images 503 and 504 are coupled together, the changes of the screen display can be similar or different between the time when the drag operation is executed on left display 131 and the time when the drag operation is executed on right display 132.

As an example when the changes of the screen display are different, when the drag operation is executed left on left display 131, the two divided images can be coupled together by moving the screen display on right display 132 faster than that on left display 131. When the drag operation is executed left on right display 132, the two divided images can be coupled together by moving the screen display on right display 132 while arranging the screen display on left display 131.

Next, the software configuration of the portable information terminal according to this embodiment is described.

Figure 13:
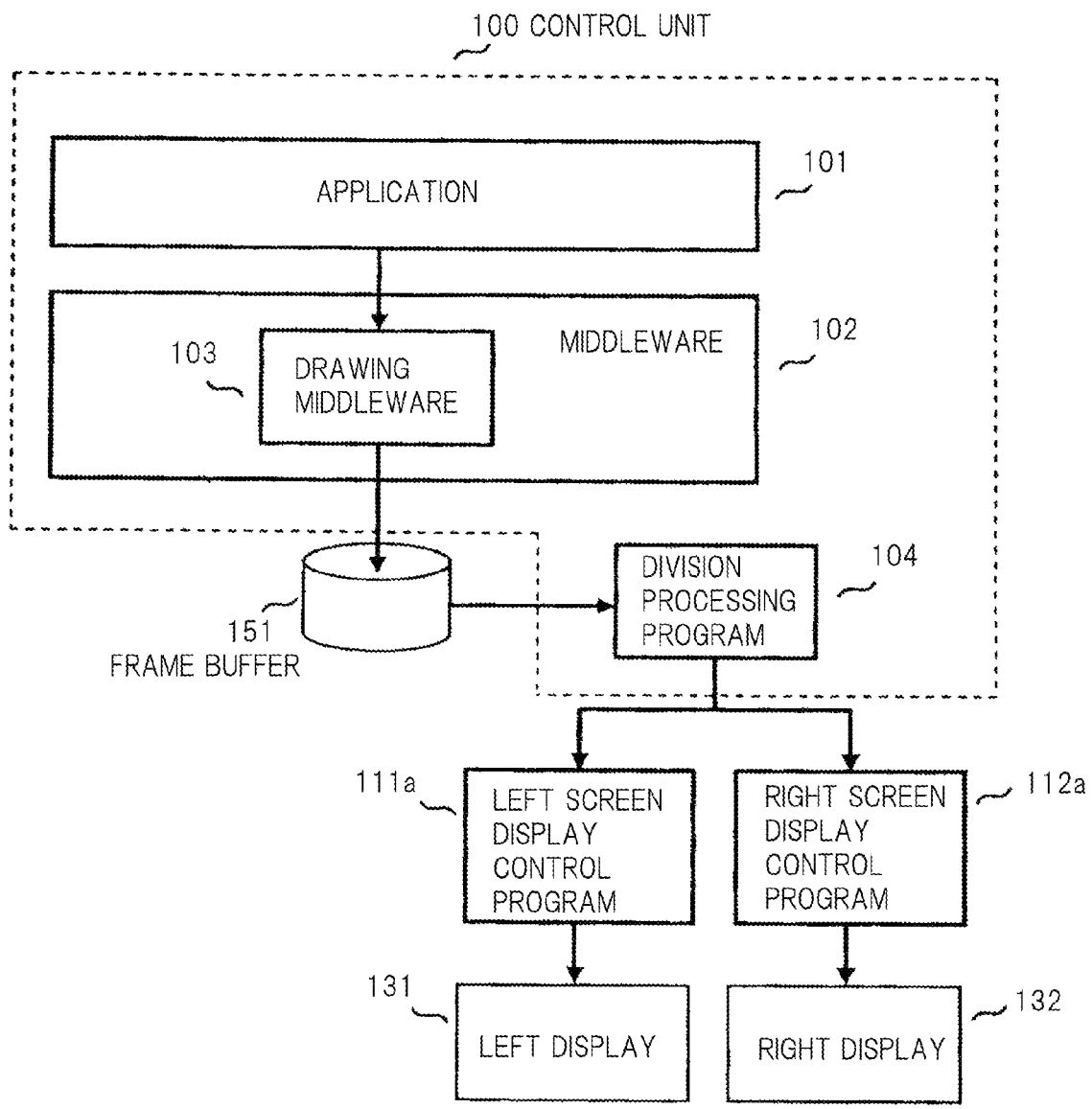
FIG. 13 shows the software configuration of the portable information terminal according to this embodiment.

FIG. 13 shows the software configuration of the portable information terminal according to this embodiment. Application 101, middleware 102, and division processing program 104 are software to enable control unit 100, shown in the functional block diagram of FIG. 2B, to execute processing. Middleware 102 includes drawing middleware 103. Left screen display control program 111a and right screen display control program 112a are software programs to enable left screen display control unit 111 and right screen display control unit 112, shown in the block diagram of FIG. 2B, to execute processing.

Division processing program 104, left screen display control program 111a, and right screen display control program 112a, which are control programs, are stored in the read-only memory of storage unit 150. Frame buffer 151 is stored in the random access memory of storage unit 151.

Application 101 writes data of the whole image to be displayed in frame buffer 151 via drawing middleware 103.

Division processing program 104 reads, by the abovementioned method, the data of the whole image from frame buffer 151, and divides the whole image into two divided images 503 and 504. Left screen display control program 111a and right screen display control program 112a respectively display divided images 503 and 504 on left display 131 and right display 132.

Due to this software configuration, although the application is not aware that the image is divided in order to be displayed on two displays 131 and 132, the application can execute general-purpose processing similar to displaying the image on one screen.

According to this embodiment, irrespective of the type of the character of each individual image, the dividing line is set at the position nearest the center in the gap between the individual images. However, the present invention is not limited to this. As another example, when the character of the individual image is a punctuation mark, the dividing line can be set in a gap immediately after the punctuation mark.

According to this embodiment, irrespective of the mutual relationship between the dividing lines in the respective rows, the dividing line is set at the position nearest the center in the gap between the individual images. However, there can be dependence between the positions of the dividing lines in the respective rows. For example, to set a dividing line in a certain row, control unit 100 can set a dividing line in the gap where the x coordinate is nearest the dividing line of its upper row.

According to this embodiment, irrespective of the width of the gap between the individual images, the dividing line is set at the position nearest the center in the gap between the individual images in the divided area. However, the present invention is not limited to this. As another example, the dividing line can be set in a gap that has widest gap among the gaps between the individual images.

According to this embodiment, in the case of a language where a sentence is described by a word including a plurality of characters, the dividing line can be set on the boundary between words. In such a case, for example, control unit 100 can detect, by the abovementioned method, the gap between characters and recognize the characters, recognize words from a character string, and set the dividing line by using, among the gaps between the characters, a gap that forms a boundary as a candidate.

According to this embodiment, the position of setting the dividing line is determined under the single condition in which the dividing line is set at the position nearest the center in the gap between the individual images. However, the present invention is not limited to this. As another example, a plurality of conditions such as nearness between the gap between the individual images and the center, a state after a punctuation mark, and the width of the gap can be weighted to integrate the points of the respective gaps, and the dividing line can be set in the gap having the highest point.

According to this embodiment, dividing line 502 is set by the processing executed by division processing program 104 without any involvement of application 101. However, the present invention is not limited to this. In which of the gaps between the individual images the dividing line is set can be designated for a part or all the range of $0 \leq y \leq H$ from application 101. In such a case, for the designated part, the division processing program can set the dividing line in the gap designated from application 101 among the gaps between the individual images.

Alternatively, among the gaps between the individual images, the gap in which setting of any dividing line is prevented can be set for division processing program 104 from application 101. In such a case, division processing program 104 can set the dividing line in the gap other than the gap in which setting of any dividing line is prevented among the gaps between the individual images.

The feature of an area in which the setting of any dividing line is prevented can be set for division processing program 104, and division processing program 104 does not set any dividing line in the area having the feature. For example, setting the feature of pop-up displaying can prevent division of a pop-up display into two.

According to this embodiment, the processing for setting dividing line 502 in the gap between the individual images is always executed. However, the present invention is not limited to this. As another example, whether to validate or invalidate the processing for setting the dividing line in the gap between the individual images can be switched according to the user's desire, designation from the application, or the application type. When the processing for setting the dividing line in the gap between the individual images is invalid, control unit 100 can divide the whole image by the center line when one whole image is divided to be displayed on left display 131 and right display 132.

According to this embodiment, during screen switching or at the end time of scrolling, animation processing can be executed, which enables the user to recognize division processing when the whole image is divided into two divided images 503 and 504 to be displayed. For example, when the whole image is divided into two divided images 503 and 504 to be displayed, displaying on both or one of two displays 131 and 132 can be vibrated as in the case of a spring.

According to this embodiment, when the whole image includes a moving image as an individual image, the moving image is identified as an individual image as in the case of a still image, and a dividing line is set to prevent division of the individual image as much as possible. When the individual image is located over the width of the divided area, control unit 100 sets the dividing line to divide the individual image so as not to divide the range where an object to be avoided is present by template matching. In addition, when the individual image to be divided is a moving image, control unit 100 can set the dividing line to avoid a part of large motion based on the distribution of the amount motion of in the individual image. The amount motion of each part in the individual part can be acquired from motion compensation information.

This embodiment has been described, for convenience, by way of example where two displays 131 and 132 are horizontally used. However, the present invention is not limited to this. The present invention can similarly be applied when two displays 131 and 132 are vertically arrayed. In both cases where two displays 131 and 132 are vertically and horizontally arrayed, a row that includes a plurality of individual images in the same direction as that of two displays 131 and 132 is detected, and a dividing line is set to pass through gaps between the individual images included in the row.

Two displays 131 and 132 may be horizontally used, and the whole image may include a vertically written sentence. Two displays 131 and 132 may be vertically used, and the whole image may include a vertically written sentence. In such a case, according to this embodiment, the abovementioned method can be directly used, or another method can be used only for this part. For example, when two displays 131 and 132 are horizontally used, control unit 100 can detect the part of the vertically written sentence included in the whole image, and set a dividing line between rows in this part. The row of the vertically written sentence part can be detected, for example, by applying the abovementioned method for detecting the row in the x axis direction in the y axis direction.

The width 2L of the divided area in this embodiment can be set to 2W, and the entire screen of displays 131 and 132 can be set as a divided area. In such a case, dividing line 502 may be set near the left end of left display 131, or near the right end of right display 132. When two upper and lower large images are intricately arranged, the horizontal part of dividing line 502 may become long, and the two large images located above and below the horizontal part may be arranged on two displays 131 and 132.

Control unit 100 of this embodiment can be displayed by the same color as that of the background in the whole image so that the user can naturally see between divided image 503 and the outer edge of left display 131 and between divided area 504 and the outer edge of right display 132.

Alternatively, control unit 100 of this embodiment can be displayed to be differentiated from other parts so that the user can easily recognize dividing line 502, between dividing line 502 and the outer edges of displays 131 and 132, or both.

Figure 14:
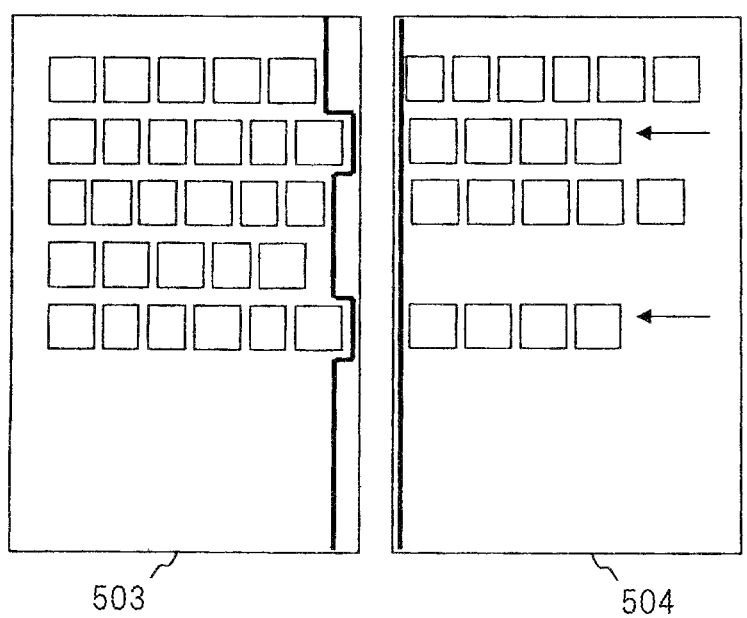
FIG. 14 shows the adjustment of the distance between the individual images between divided image 503 and divided image 504.

According to this embodiment, control unit 100 can process divided images 503 and 504 to adjust the distance between the individual images changed due to the divided displaying of divided images 503 and 504 acquired by dividing the whole image by dividing line 502 on left display 131 and right display 132. For example, as shown in FIG. 14, divided image 504 can be processed to move the individual image in right divided image 504 to the left side. Further, divided image 503 can similarly be processed to move the individual image in left divided image 503 to the right side.

This embodiment has been described by way of example where there are two displays. However, the present invention is not limited to this. The invention can similarly be applied to a case where there are three displays.

The embodiment of the present invention has been described. However, the embodiment is in no way limitative of the invention. Various changes understandable to those skilled in the art can be made of the configuration and the details of the present invention specified in the appended claims.

This application claims priority from Japanese Patent Application No. 2009-287432 filed Dec. 18, 2009, which is hereby incorporated by reference herein in its entirety.

The invention claimed is:

1. A portable information terminal comprising:
display means including a plurality of display screens; and
control means for dividing a whole image including two or more rows of individual images arrayed in a direction where the plurality of display screens are arrayed into a plurality of divided images by a dividing line passing through gaps between the individual images in the respective rows, and displaying each of the divided images on each of the display screens of the display means,
wherein the control means defines, when there is a plurality of gaps in the row, the dividing line with priority given to a gap near an initial dividing line that is defined based on a width of each of the display screens over other gaps.

2. A portable information terminal comprising:
display means including a plurality of display screens; and
control means for dividing a whole image including two or more rows of individual images arrayed in a direction where the plurality of display screens are arrayed into a plurality of divided images by a dividing line passing through gaps between the individual images in the respective rows, and displaying each of the divided images on each of the display screens of the display means,
wherein the control means defines, when there is a plurality of gaps in the row, the dividing line with priority given to a large gap between the individual images over other gaps.

3. A portable information terminal comprising:
display means including a plurality of display screens; and
control means for dividing a whole image including two or more rows of individual images arrayed in a direction where the plurality of display screens are arrayed into a plurality of divided images by a dividing line passing through gaps between the individual images in the respective rows, and displaying each of the divided images on each of the display screens of the display means,
wherein the control means defines, when there is no gap in the row, the dividing line to divide the individual image at a position where a specific part included in the individual image is not divided, and
wherein the control means defines, when the individual image is a moving image, the specific part based on a distribution of an amount of motion in the individual image.

4. A portable information terminal comprising:
display means including a plurality of display screens; and
control means for dividing a whole image including two or more rows of individual images arrayed in a direction where the plurality of display screens are arrayed into a plurality of divided images by a dividing line passing through gaps between the individual images in the respective rows, and displaying each of the divided images on each of the display screens of the display means,
wherein the control means defines, when there is no gap in the row, the dividing line to divide the individual image at a position where a specific part included in the individual image is not divided, and
wherein the control means displays the divided image where the individual image has been divided on the display screen by deleting a part corresponding to a gap of the display screen from the individual image.

5. A portable information terminal comprising:
display means including a plurality of display screens;
control means for dividing a whole image including two or more rows of individual images arrayed in a direction where the plurality of display screens are arrayed into a plurality of divided images by a dividing line passing through gaps between the individual images in the respective rows, and displaying each of the divided images on each of the display screens of the display means; and
input means for detecting a user's operation input,
wherein the control means brings, during displaying of the divided images divided by the dividing line on the display screens, when an operation input for scrolling the whole image is executed to the input means, the divided images close to each other to couple the images together following the scrolling.

6. The portable information terminal according to claim 5, wherein the control means defines, when the scrolling ends after the divided images have been coupled together, a new dividing line to divide the whole image, and displays divided images thus acquired on the display screens.

7. The portable information terminal according to claim 6, wherein the control means defines, when the scrolling ends, the new dividing line in a predetermined area in a first display screen located on a moving destination side of the scrolling to divide the whole image, fixes a divided image to be displayed on the first display screen on the first display screen, and displays a divided image to move the divided image to be displayed on a second display screen located on a moving source side of the scrolling to the second display screen.

8. A portable information terminal comprising:

display means including a plurality of display screens; and control means for dividing a whole image including two or more rows of individual images arrayed in a direction where the plurality of display screens are arrayed into a plurality of divided images by a dividing line passing through gaps between the individual images in the respective rows, and displaying each of the divided images on each of the display screens of the display means, wherein the control means defines the dividing line in a gap in a predetermined divided area in the whole image, and wherein the control means detects the rows in the divided areas and individual images included in the rows based on a binary image acquired by binarizing a difference in pixel value between the adjacent pixels in the divided areas, sets dividing lines passing through gaps between the individual images in the respective rows, and connects the dividing lines of the respective rows into one.

9. A display control method in a portable information terminal including a plurality of display screens, comprising:

dividing, by control means, a whole image including two or more rows of individual images arrayed in a direction where the plurality of display screens are arrayed into a plurality of divided images by a dividing line passing through gaps between the individual images in the respective rows; and displaying, by the control means, each of the divided images on each of the display screens of the display means, wherein the control means brings, during displaying of the divided images divided by the dividing line on the display screens, when an operation input for scrolling the whole image is executed, the divided images close to each other to couple the images together following the scrolling.

10. A portable information terminal comprising:

display means including a plurality of display screens; and control means for dividing a whole image including two or more rows of individual images arrayed in a direction where the plurality of display screens are arrayed into a plurality of divided images by a dividing line passing through gaps between the individual images in the respective rows, and displaying each of the divided images on each of the display screens of the display means, wherein the control means defines the dividing line in a gap in a predetermined divided area in the whole image, and wherein the control means defines, when there is a plurality of gaps in the row, the dividing line with priority given to a gap near an initial dividing line that is defined based on a width of each of the display screens over other gaps.

11. A portable information terminal comprising:

display means including a plurality of display screens; and control means for dividing a whole image including two or more rows of individual images arrayed in a direction where the plurality of display screens are arrayed into a plurality of divided images by a dividing line passing through gaps between the individual images in the respective rows, and displaying each of the divided images on each of the display screens of the display means, wherein the control means defines the dividing line in a gap in a predetermined divided area in the whole image, and wherein the control means defines, when there is a plurality of gaps in the row, the dividing line with priority given to a large gap between the individual images over other gaps.

12. The portable information terminal according to claim 1, wherein the control means defines, when there is a plurality of gaps in the row, the dividing line with priority given to a large gap between the individual images over other gaps.

* * * * *